3,843,553
CATALYST COMPOSITIONS OF SCHEELITE CRYSTAL STRUCTURE CONTAINING BISMUTH IONS, DIVALENT IONS AND CATION VACANCIES
Kamran Aykan, Woodbury, N.J., and Donald B. Rogers and Arthur W. Sleight, Wilmington, Del., assignors to E. I. du Pont de Nemours and Company, Wilmington, Del.
No Drawing. Continuation-in-part of abandoned application Ser. No. 75,237, Sept. 24, 1970. This application Oct. 4, 1971, Ser. No. 186,409
Int. Cl. B01j 11/06
U.S. Cl. 252—464              14 Claims

ABSTRACT OF THE DISCLOSURE

Catalysts for the oxidation, ammoxidation and oxidative dehydrogenation of olefins comprise compositions having a scheelite type crystal structure, bismuth, divalent ions, and cation vacancies. Illustrative is

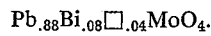

$Pb_{.88}Bi_{.08}\square_{.04}MoO_4$.

RELATED APPLICATION

This application is a continuation-in-part of our application Ser. No. 75,237 filed Sept. 24, 1970, now abandoned.

BACKGROUND OF THE INVENTION

Field of the Invention

The invention relates to catalytic oxidation and ammoxidation of olefins, as for example, the conversion of propylene to acrolein or to acrylonitrile. The catalysts have a scheelite type crystal structure and contain bismuth ions, divalent ions, and cation vacancies.

Prior Art

Catalysts for the oxidation and ammoxidation of olefins are known in the art and include materials based on bismuth molybdate where the bismuth is present above a definite minimum ratio with respect to the molybdenum. The art generally teaches the amount of bismuth should not be less than ⅓ the amount of molybdenum and preferably the ratio should be 3:4, or more, in order to avoid sublimation of the molybdenum and consequent decomposition of the catalyst. Such catalysts have disadvantages in being relatively brittle and thermally unstable. Austrian patents 247,304 and 248,410 seek to overcome these disadvantages by combining bismuth and molybdenum oxides with divalent metals such as calcium and lead. Koch patent U.S. 3,387,038 teaches that molybdenum oxide is effective as a catalyst when combined solely with alkaline earth oxides although the catalytic effect is further promoted by minor amounts of many elements including bismuth. Even the preferred embodiments of Koch's catalysts, however, give relatively low conversions of propylene to acrolein and require the periodic addition of molybdic acid in order to prevent the loss of that activity.

Silicon and phosphorus are widely recognized as useful promoters for bismuth-molybdenum oxide compositions used as catalysts. This is believed to be related to the well known tendency of these two elements to combine in mixed oxides (heteropoly acids) with molybdenum and tungsten. Silica can be intimately incorporated by combining the catalyst precursors in the presence of a colloidal silicic acid. Even though such silica may be termed a "support," its special interaction is recognized by Callahan et al., U.S. 3,362,998 and McClellan, U.S. 3,415,886, and auxiliary supports are generally used to support these silica-bearing catalysts during reaction.

DESCRIPTION OF THE INVENTION

It has now been found that compositions having a phase, generally indicated by the formula $ABO_4$, of scheelite type crystal structure in which about 0.1 to about 7.5% of the A cation sites are vacant, that is, not occupied by any ion, some of which are occupied by bismuth ions, and some of which are occupied by divalent ions, are effective catalysts for the ammoxidation of olefins to unsaturated nitriles, the oxidation of olefins to unsaturated aldehydes, and the oxidative dehydrogenation of olefins to diolefins. The number of the A sites that are either cation vacancies (represented hereinafter by the symbol $\square$) or occupied by bismuth ions may be very small but these two types of site occupation must coexist for the composition to have high catalytic activity.

It has been further found that the remaining A cation sites, and the B cation sites, may be occupied by a variety of positive ions of appropriate size, that is, having ionic radii which will not substantially change the scheelite crystal structure. A large number of ions may be selected provided the electrical charge of the composition is zero.

The ions occupying the type A sites of the scheelite type crystal structure generally are coordinated by eight surrounding oxygen atoms and have ionic radii appropriate to this coordination in the range of about 0.9 to about 1.6 A. According to the invention the number of cation vacancies may range from about 0.1% to about 7.5% of the total type A cation sites. Other type A cation sites are occupied by bismuth and one or more divalent ions from the group calcium, strontium, barium, lead, cadmium and mercury. Other ions of appropriate size may occupy the remaining type A cation sites, such as, for example sodium, lithium, potassium, and yttrium.

The ions occupying the type B sites of the scheelite type crystal structure are generally tetrahedrally coordinated by oxygen and have ionic radii appropriate to this coordination ranging from about 0.3 to about 0.5 A. The type B cations are selected from the group consisting of molybdenum and/or tungsten.

It is preferred for maximum effectiveness that the catalyst consist essentially of a single phase.

A further preferred embodiment of the invention, because of their excellent catalytic activity are the compositions $ABO_4$ in which about 0.5 to about 5% of the A cation sites are vacant.

A further preferred embodiment is the group of catalyst compositions containing lead as an A cation and molybdenum and/or tungsten as B cation.

The invention may thus be described as a catalyst which has scheelite type crystal structure of the general formula

$A_{1-z}\square_zBO_4$ wherein

A represents cations having ionic radii in the range of about 0.9 to about 1.6 A. some of which are trivalent bismuth and at least one other is selected from the group consisting of lead, calcium, strontium, barium, cadmium and mercury; and optionally a cation selected from the group consisting of sodium, lithium, potassium and yttrium;

B represents cations having ionic radii in the range of about 0.3 to about 0.5 A. comprising molybdenum or molybdenum and tungsten, with the proviso that when A represents bismuth and lead B can represent tungsten alone;

$\square$ represents a cation vacancy in the crystal structure; and $z$ represents a positive number in the range of about 0.001 to about 0.075, preferably about 0.005 to 0.05.

The above values for $z$ correspond to about 0.1% to about 7.5% and about 0.5% to 5%, respectively.

"Scheelite type crystal structure" means a phase of generic type $ABO_4$ with an atomic arrangement analogous to that found in the mineral scheelite ($CaWO_4$). A discussion of scheelite type crystals may be found in R. W. G. Wyckoff "Crystal Structures," Vol 3, second edition 1965, pp. 19–22, published by Interscience Publishers. Scheelite type crystal structures generally have tetragonal symmetry and can be characterized by the two lattice constants $a_0$ and $c_0$ as obtained by X-ray diffraction data. The range of $a_0$ is about 4.8 to 6.0 A. and the ratio of $c_0/a_0$ is about 2. The atomic arrangement in the scheelite type structure, also given by Wyckoff, gives rise to a characteristic X-ray diffraction pattern by which materials having scheelite type crystal structure can be identified.

It is to be understood that "scheelite type crystal structure" is intended here and in the claims to also cover variant crystal structures which have minor distortions in angle or edge size from the usual or classical tetragonal symmetry given above. For example, when the distortion resides in a third lattice constant, $b_0$, an orthorhombic distortion results while a distortion in either angle $\beta$ or $\gamma$ results in a monoclinic distortion. Where $b_0$ is within 10% of the value of $a_0$, each being in the range of about 4.8 to 6.0 Å, and where the angle $\beta$ or $\gamma$ is within 5° of the normal 90° angle, such crystal structures are contemplated to be within the scope of scheelite crystal structures of this invention. It should also be noted that $a_0$ and $c_0$ or $b_0$ and $c_0$ may be interchanged to conform to certain crystallographic conventions and in the case of monoclinic symmetry the unit cell may be redefined so that $\beta$ or $\gamma$ departs greatly from 90°. In all the variations which may occur, however, the essential atomic arrangement is present which determines and characterizes scheelite type crystal structure. That atomic arrangement is identified by the characteristic X-ray diffraction pattern it produces even though some of the diffraction peaks will be split in the case of the variant crystals.

It will also be recognized that where a single type of cation site is occupied by more than one cation then under some conditions nonrandom site occupation will produce superstructure lines in the characteristic scheelite type X-ray pattern. Under such circumstances the exact characterization by unit cell parameters will require multiplication of one or more of the unit cell dimensions by a small whole number in order to characterize the special proportionate distribution of cations.

The charge on the various A and B metal ions can be varied consistent with the requirement that the sum of the positive charges of all A and B metal ions is exactly balanced by the sum of the charges on the negative ions. the generic formula $ABO_4$ for scheelite type structure thus includes ternary oxides ranging from $$A^{+1}B^{+7}O_4 \text{ to } A^{+4}B^{+4}O_4$$

as well as polynary oxides where either A or B or both may comprise a mixture of ions of appropriate size whose average charge is covered by the range above.

The presence of bismuth ions on the type A cation sites can be determined by customary analytical procedures for the determination of bismuth since its ions are too large for the type B sites. In eight-fold coordination $Bi^{3+}$ has an ionic radius of 1.11 Å and is well suited for type A sites.

The presence of unoccupied type A cation sites can be determined by a deficiency of type A cations with respect to type B metal ions. Since in the scheelite type structure there is one A and one B site per formula $ABO_4$ and since the B cation sites are always fully occupied by the type B atoms, the number of type A cation vacancies, $z$, can be determined by subtracting the number of type A atoms from the number of type B atoms. Thus in the single-phase scheelite type composition whose formula has been determined by elemental analysis as $$Pb^{+2}_{.91}Bi^{+3}_{.06}Mo^{+6}O_4,$$

the sum of the type A gram atoms is 0.97. Since there is one B type atom (molybdenum) present in the above formula, it follows that the sum of the two types A atoms (lead and bismuth) plus any type A site vacancies, must equal 1. As noted, however, the type A atoms which are present total only .97 which indicates there are .03 type A sites that are vacant. The formula for the above single phase scheelite type composition is therefore more properly written as $$Pb_{.91}Bi_{.06}\square_{.03}MoO_4$$

This composition is electrically neutral since the 8 negative charges from oxygen are just balanced by 6 positive charges from molybdenum, .18 (3×.06) from Bi, and 1.82 from Pb for a total of 8 positive charges.

The $BO_4$ tetrahedra are characteristic of the scheelite type structure even though a certain amount of type A cations which link adjacent tetrahedra may be missing from the lattice. Thus, oxides of the scheelite type phase will have, within normal analytical accuracy, four oxygen anions per B cation. In preparing scheelite type catalysts of the invention the component oxides or their oxide precursors should be chosen so that in their normal oxidation states after calcining, as hereinafter described, four gram atoms of oxygen will be present for each gram atom of B cation. The presence of substantially more or less oxygen relative to the B cation will lead to dilution of the $ABO_4$ catalyst of the invention with another phase. The proper proportions of the various oxides or oxide precursors that should be combined to form a pure scheelite type phase of desired vacancy content can be readily determined from the requirements of electroneutrality and site occupation described above. In the simple cases where a single ion occupies the B sites and the necessary cation vacancies result from simple permutation of the A cation charge, the following generic formulae pertain for ternary metal oxides, where $z$ equals the number of vacancies:

$$A^{+1}_{.5-1.5z}A^{+3}_{.5+.5z}\square_z B^{+6}O_4$$

$$A^{+2}_{1-3z}A^{+3}_{2z}\square_z B^{+6}O_4$$

It should be kept in mind that when the number of defects or cation vacancies becomes too high, their random occurrence may be replaced by an ordered arrangement with the production of a crystal structure that departs from the limits hereinbefore described for the scheelite type structure. It is to be expected that the change from the scheelite type structure to other phases with ordered vacancies will depend in a complex way on the temperature and on the particular ions in the lattice. In scheelite type systems containing divalent ions as exemplified by lead the tolerance for vacancies is more limited than in systems containing substantial amounts of monovalent ions. For example, no more than about 7½% cation vacancies (i.e., $z$ is less than .075) have been found in the scheelite type phase $$Pb_{1-3z}Bi_{2z}\square_z MoO_4$$

equilibrated at temperatures within the preferred operating range (350–550° C.) of the catalyst processes of the invention. The catalytic activity is not destroyed if another phase is present along with the scheelite type phase. However, it is desirable for maximum effectiveness to have the catalysts as substantially pure phases at the operating temperature. These are characterized by X-ray diffraction powder diagrams which can be indexed in their entirety according to the scheelite type structure. Large amounts of excess or unreacted components will act as diluents and can interfere with the intended catalytic function, particularly if they accumulate at the surface.

The catalysts of the invention may thus be characterized in that:

1. There are four oxygen atoms for each B atom.
2. The type A and type B ions are selected from those cations appropriate to the scheelite type structure as indicated herein.
3. They are electrically neutral, the number of positive charges exactly equaling the number of negative charges.
4. The type A sites, equal in number to the type B sites, include about 0.1 to about 7.5% unoccupied sites and sites which are occupied by trivalent bismuth as well as one or more ions from the group lead, calcium, strontium, barium, cadmium and mercury.
5. Their X-ray diffraction pattern is characteristic of scheelite type crystal structure.

The catalysts of the invention can be prepared by various methods. The usual method is to calcine mixtures of oxides, or any salt which yields the corresponding oxide by thermal decomposition, e.g., carbonates, nitrates, oxalates, hydroxides, etc., in the proper ratios for the desired composition. The catalysts can also be prepared by mixing solutions containing proper amounts of the type A and type B metal salts, evaporating, drying, and finally calcining. The starting solutions are usually nitrates in the case of $A^{+1}$, $A^{+2}$, $A^{+3}$ and Bi, but other soluble salts can be used. The solvent can be water or an organic liquid depending on the solubility of the salt. The amount of solvent is not critical and it is preferred to use only that amount needed to effect complete solution of the salt.

Calcining temperatures vary from about 400 to about 1100° C. The optimum temperature depends upon the particular catalyst being prepared. Higher temperatures are preferred in order to facilitate reaction and to assure a homogeneous product. Whatever the temperature may be at which the catalysts are produced, the compositions should be chosen to be reasonably stable at the temperature of use. A critical upper limit for calcining temperatures is imposed by the formation of a liquid phase. The products of the invention have incongruent melting points, i.e., the liquid and solid in equilibrium in the melting range have quite different compositions. A liquid phase formed during calcining tends to produce both compositional and physical segregation which are difficult to homogenize at lower temperature. Higher temperatures are favored in general for catalysts containing tungsten while lower temperatures are used for catalysts rich in bismuth, lead, and molybdenum.

The time of calcination is not critical; times of 1 to 100 hours may be used, but 16–48 hours is preferred. Longer times are required at lower temperatures. Calcining times may be shortened and homogeneity of the products improved by regrinding between periods of heating. A generally advantageous procedure is to grind the dry components intimately, calcine for 2–16 hours at 600–800° C., then regrind and calcine again for 16–32 hours at 600–800° C.

The container used for calcining may be made of various inert materials such as gold or other precious metals, alumina or other ceramics. The calcination is usually carried out in a muffle furnace in which the sample is exposed to an atmosphere of air. Reducing atmospheres should be avoided to prevent the reduction of oxides of easily reduced metals such as lead and bismuth.

The completeness of the reaction may be followed by X-ray diffraction of the products at any stage. When formation of a cation-deficient tetragonal scheelite type phase is complete, all lines of the X-ray powder pattern can be indexed on the basis of a scheelite type unit cell with line intensities in qualitative agreement with those expected for the scheelite type structure. The dimensions of the unit cells of these scheelite type phases vary significantly with changes in either type or number of cations in the A sites, and can be used to characterize the composition of the phase obtained. For example, in the tetragonal system $$Pb_{1-3z}Bi_{2z}\square_z MoO_4$$

equilibrated at 800° C., the unit cell length, $c_0$ decreases regularly from 12.091 to 12.047 A. as $z$ is increased from 0 to 0.075. Further attempts to increase $z$ do not affect $a_0$ or $c_0$ but eventually cause additional lines of a monoclinic phase to appear. This indicates a limit of about 7½% cation vacancies in the scheelite phase of this particular composition at this particular temperature. The presence of a cation deficient scheelite type structure of the invention is shown by the significant difference in the cell dimensions from those of the defect-free phases. The same vacancy limit of about 7½% appears to prevail at about 550° C. but temperatures above 800° C. or below 550° C. appear to produce a lower maximum limit of vacancies in this system.

The catalysts of the invention are excellent heterogeneous catalysts for organic oxidation reactions. They are particularly useful for the oxidation of propylene to acrolein, the production of acrylonitrile from propylene, $NH_3$, and $O_2$, and the conversion of butene to butadiene. The catalysts show excellent conversions of propylene, good selectivity, and retain their high initial activity without need for frequent and costly regeneration steps. The presence of water in the feed gas is not necessary as it is with many prior art catalysts, but it may be used if desired. Air or oxygen may be used, or the feed gas may be further diluted with nitrogen, for example. The catalysts may be used in fixed-bed or fluidized-bed reactors; they may be used with most of the usual catalyst support materials or they may be used without support, and any type of reactor suitable for vapor phase reactions may be employed.

The temperature of the reaction zone may vary from 350° C. to 550° C., although it is preferred to operate within the temperature range of 400° C. to 500° C. The actual surface temperature of the catalyst particles may be considerably higher because of the exothermic nature of the reaction. Pressure is not a critical factor in the practice of this invention. The process may be conveniently operated at atmospheric pressure. In most instances, the reaction is conducted at pressures ranging from 0.5 to 10 atmospheres, but higher or lower pressures may be used if desired.

The oxygen used in this process may be obtained from any source, although it is generally most economical and convenient to use air. Alternatively, pure oxygen or mixtures of oxygen and air may be employed in the oxidation process, including the oxidative dehydrogenation process, and a mixture of air and ammonia for the ammoxidation process.

The importance of having both bismuth and type A cation vacancies is illustrated in the reaction of propylene, air, and ammonia to form acrylonitrile. These reactions are carried out at atmospheric pressure in a ½ inch I.D. fixed-bed stainless steel U-tube reactor. The temperature is maintained at 460° C. The feed gas is propylene/air/ammonia in a 1/12/1.2 molar ratio, diluted with 40–45 mole percent of nitrogen, with gas velocity at such a rate as to provide a 6–8 second contact time with the catalyst. On-stream analyses of hot effluent gases are made using gas chromatographic analysis. The catalysts are used as ⅛ inch pellets containing the lead-molybdenum composition indicated in Table I mixed with 50% silicon carbide powder as a catalyst support. To provide an accurate comparison, all of the compositions reported in Table I are prepared from appropriate quantities of PbO, $MoO_3$ (and $Bi_2O_3$ and $Na_2CO_3$ where used), by grinding together, calcining two hours at 800° C. regrinding, recalcining 34–58 hours at 800° C., and rapid cooling in air.

TABLE I.—EFFECT OF COMPOSITION

| Catalyst sample | Catalyst formula | | Tetragonal lattice parameters (A.) | | Mole percent of Initial $C_3H_6$ | |
|---|---|---|---|---|---|---|
| | | | $a_0$ | $c_0$ | Consumed | Converted to acrylonitrile |
| A* | $PbMoO_4$ | | 5.435 | 12.109 | 3.6 | 1.8 |
| B* | $Pb_{.87}La_{.087}\square_{.043}$ | $MoO_4$ | 5.431 | 12.088 | 9.4 | 4.8 |
| C | $Pb_{.97}Bi_{.02}\square_{.01}$ | $MoO_4$ | 5.433 | 12.100 | 61.5 | 40.1 |
| D | $Pb_{.91}Bi_{.06}\square_{.03}$ | $MoO_4$ | 5.426 | 12.082 | 96.7 | 61.2 |
| E | $Pb_{.87}Bi_{.087}\square_{.043}$ | $MoO_4$ | 5.422 | 12.068 | 95.4 | 66.5 |
| F | $Pb_{.79}Bi_{.14}\square_{.07}$ | $MoO_4$ | 5.412 | 12.046 | 97.2 | 63.4 |
| G | $Na_{.042}Pb_{.852}Bi_{.085}\square_{.021}$ | $MoO_4$ | 5.418 | 12.051 | 86.2 | 63.9 |
| H* | $Na_{.083}Pb_{.834}Bi_{.083}$ | $MoO_4$ | 5.414 | 12.035 | 26.0 | 9.8 |

*Do not have bismuth and cation vacancies.

TABLE II.—EFFECT OF CATALYST SUPPORT

| Catalyst sample | Catalyst support for $Pb_{0.88}Bi_{0.08}\square_{0.04}$ $MoO_4$ | Mole percent of Initial $C_3H_6$ | |
|---|---|---|---|
| | | Consumed | Converted to acrylonitrile |
| J | None | 98.5 | 75.7 |
| K | 50% $SiO_2$ (calcined at 900° C.) | 97.7 | 63.7 |
| L | 50% $ZrO_2$ | 98.4 | 67.4 |
| M | 50% $Nb_2O_5$ | 99.5 | 60.3 |
| N | 50% $TiO_2$ (anatase) | 98.4 | 58.8 |
| O | 25% $PbMoO_4$ | 98.5 | 69.7 |
| P | 50% mullite | 94.4 | 64.8 |
| Q | 50% $Al_2O_3$ (A-400 mesh) | 96.1 | 60.8 |

In Table I the second column shows the catalyst composition as determined from the proportion of ingredients used in their preparation. The cation vacancies, if any, are obtained by subtracting from the g atoms of Mo the total g atoms of the other cations. It should be noted that catalyst samples A and H do not have any cation vacancies and sample B does not contain bismuth and accordingly are outside the scope of the invention. X-ray diffraction by each sample indicated a single-phase scheelite type structure whose tetragonal lattice parameters are given in third and fourth columns. The fifth column shows the mole percent of propylene in the feed which was consumed (that is, converted to reaction products) while the last column shows the mole percent of propylene in the feed which was converted to acrylonitrile.

Extremely slight changes in composition, if properly directed, can produce valuable improvement in catalyst performance. The data of Table I clearly show that neither the presence of cation vacancies alone (sample B) nor the presence of bismuth ions alone (sample H) is sufficient to produce a good catalytic activity in the scheelite type phase; however, when both coexist, even in small amounts, excellent conversion of propylene to acrylonitrile is obtained.

Table II illustrates the use of various inert materials as catalyst supports in the ammoxidation of propylene to acrylonitrile. The conditions used are substantially the same as described in connection with Table I. For the purpose of comparison the same catalyst material,

$Pb_{0.88}Bi_{0.08}\square_{0.04}MoO_4$, was used in all cases. It is first ball milled separately, then together with the inert support material, and finally formed into ⅛" pellets with the aid of a small amount of a polyvinyl alcohol binder. The polyvinyl alcohol is removed before use by slowly heating in a stream of air to about 500° C. The results in Table II show that good conversions of propylene to acrylonitrile are obtained using any of the inert supports commonly used for ammoxidation catalysts. Even better conversions are shown when a self-supported catalyst is used. Thus, the use of a self-supported scheelite type phase containing both bismuth ions and cation vacancies is a preferred catalyst for the preparation of acrylonitrile.

The use of very high surface area or reactive materials as catalyst supports is to be avoided. In particular, intimate mixtures of the cation deficient scheelite type catalysts with reactive materials other than the desired feed stock should not be excessively heated. In sample K of Table II the inert silica support material was obtained by evaporating to dryness an aqueous solution of colloidal silica and then calcining the dry residue for 16 hours at 900° C. The $SiO_2$ was thereafter cooled and mixed with the catalyst to give the results indicated. Where instead, the solution of colloidal silica was added to the powdered catalyst, the mixture evaporated to dryness and then heated at 500° C., the "supported" catalyst containing combined silicon is less efficient, converting only about 30% of the propylene to acrylonitrile.

It will be obvious to one skilled in the use of catalysts for carrying out oxidation reactions that the composition of the catalytic sites on the catalyst surface during the course of the reaction may depart somewhat from initial stoichiometry. Particularly in oxidation reactions elements of variable valency may coexist in more than one oxidation state as an essential feature of the catalytic mechanism. Thus in the present invention it is contemplated for example that Mo or W may be present to a small extent as pentavalent species along with the preponderant hexavalent species. Similarly, bismuth could exist to some small extent in an oxidation state greater than in the normal trivalent cation. Such variations can be equivalently represented as slight departures from the oxygen stoichiometry hereinbefore described. Thus in the idealized $ABO_4$ formula there might be slightly more or less than 4.00 g. atoms of oxygen, or a small fraction of the $O^{-2}$ ions might be replaced by $OH^-$ ions without departing from the spirit of the invention.

By the term "olefin" as used herein is meant the open-chain as well as cyclic olefins. Among the many olefinic compounds which may be utilized in accordance with the process of the invention, the following compounds are illustrative: propylene, butene-1, butene-2, isobutylene, pentene-1, pentene-2, 3-methylbutene-1, 2-methyl-butene-2, hexene-1, hexene-2, 4-methyl pentene-1, 3,3-dimethyl-butene-1, 4-methyl-pentene-2, octene-1, cyclopentene, cyclohexene, 3-methyl-cyclohexene, etc. This invention is directed particularly to the oxidation of the lower alkenes (3 to 8 carbon atoms) but higher alkenes may also be utilized with efficacy. These compounds and their vraious homologs and analogs may be substituted in the nucleus and/or in the substituents in various degrees by straight-chain alicyclic or hetero-cyclic radicals. The process of the invention is applicable to individual olefins as well as to mixtures of olefins.

The process of this invention is particularly adapted to the conversion of propylene to acrolein, isobutylene to methacrolein, butene-1 or butene-2 to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like.

SPECIFIC EMBODIMENTS OF THE INVENTION

The following are illustrative examples in which all parts or percentages are by weight unless otherwise stated.

EXAMPLE 1

143.95 g. of $MoO_3$, 18.64 g. of $Bi_2O_3$ and 196.42 g. of PbO are ball-milled under acetone for one hour, calcined in air for 16 hours at 600° C., again ball-milled for one hour, and calcined 16 hours at 800° C. The product is a single-phase tetragonal scheelite type structure with $a_0=5.424$ A., $c_0=12.072$ A. and has the formula $$Pb_{0.88}Bi_{0.08}\square_{0.04}MoO_4.$$

Portions of this product were ground together with various catalyst supports, pelleted, and tested, as described in connection with Table II. The product is a good catalyst for the synthesis of acrolein, as well as for the synthesis of acrylonitrile.

EXAMPLE 2

14.230 g. of PbO, 1.510 g. of $NaCO_3$, 4.065 g. of $Y_2O_3$, 2.796 g. of $Bi_2O_3$, and 21.592 g. of $MoO_3$ are ground together and calcined in a platinum dish exposed to air in five successive stages, with the contents being reground between each separate stage. The stages are (1) 16 hours at 625° C., (2) 16 hours at 625° C., (3) 64 hours at 750° C., (4) 16 hours at 750° C., and (5) 16 hours at 800° C. The product rapidly cooled in air from 800° C. is a scheelite type phase with $a_0=5.319$ A. and $c_0=11.753$ A. whose composition is $$Pb_{0.425}Na_{0.190}Y_{0.240}Bi_{0.080}\square_{0.065}MoO_4.$$

It was found to be catalytically active for converting propylene to acrylonitrile (conversion 54.1% at 500° C.). "Conversion" is understood throughout this specification to mean conversion of original feed stock to desired end product.

EXAMPLE 3

14.2172 g. of PbO, 0.9785 g. of $Bi_2O_3$, and 16.2295 g. of $WO_3$ are ground together in an agate mortar. The mixture in a gold boat is then calcined for several hours at 800° C., reground and reheated for 16 hours at 800° C. The product is a scheelite type phase with unit cell dimensions $a_0=5.45$ A. and $C_0=12.030$ A. corresponding to the formula $$Pb_{0.91}Bi_{0.06}\square_{0.03}WO_4.$$

The product was catalytically active in the synthesis of acrylonitrile from propylene (conversion 56.3% at 480° C.).

EXAMPLE 4

39.281 g. of PbO, 3.728 g. of $Bi_2O_3$, 14.394 g. of $MoO_3$, and 23.185 g. of $WO_3$ are ground together. The mixture is heated 16 hours at 800° C, then reground and heated again for 68 hours at 800° C. The product is a scheelite type phase, $a_0=5.436$ A., $C_0=12.0436$ A., with a composition $$Pb_{0.88}Bi_{0.08}\square_{0.04}Mo_{0.50}W_{0.50}O_4.$$

The product was catalytically active in the synthesis of acrylonitrile from propylene (conversion 75.5% at 460° C.).

EXAMPLE 5

A mixture of 0.8858 g. of $SrCO_3$, 0.1398 g. of $Bi_2O_3$, and 0.9932 g. of $MoO_3$ were ground together and then heated for two hours at 800° C. in a gold boat. It was then reground and heated again at 800° C. for two days. The sample was again reground and finally heated about 16 hours at 900° C. The product was a white powder. Most of the X-ray diffraction lines could be indexed as belonging to a cation deficient scheelite type phase with tetragonal unit cell, $a_0=5.3894$ A., $c_0=11.9967$ A., whose nominal composition is $$Sr_{0.87}Bi_{0.087}\square_{0.043}MoO_4.$$

EXAMPLE 6

PbO (48.365 g.), $Bi_2O$ (0.5104 g.), and $MoO_3$ (31.667 g.) were ground together and then heated for about 60 hours at 800° C. The resulting scheelite type phase has the composition $$Pb_{.985}Bi_{.01}\square_{.005}MoO_4$$

and is an active catalyst (60% conversion) for the synthesis of acrylonitrile from propylene.

EXAMPLE 7

7.8680 g. of Cd metal is dissolved in dilute nitric acid. To this solution is added 3.3957 g. of $Bi(NO_3)_3 \cdot 5H_2O$ with stirring until solution is complete. A solution containing 14.2134 g. of $(NH_4)_6Mo_7O_{24} \cdot 4H_2O$ is then added with vigorous stirring. The product recovered after evaporation is ground, and then heated in air for two hours at 600° C. in a gold boat. It is then reground and calcined again at 600° C. for 16 hours. The composition indicated from starting materials is $$Cd_{0.87}Bi_{0.087}\square_{0.043}MoO_4$$

The X-ray pattern indicates a tetragonal scheelite type phase with $a_0=5.169$ A., $c_0=11.243$ A. The product was catalytically active in the synthesis of acrylonitrile from propylene (57% conversion).

What is claimed is:

1. A catalyst which has scheelite type crystal structure of the general formula $$A_{1-z}\square_zBO_4$$

wherein

A represents cations having ionic radii in the range of about 0.9 to about 1.6 A. some of which are trivalent bismuth and (1) at least one other is selected from the group consisting of lead, calcium, strontium, barium, cadmium and mercury; or (2) a cation selected from the group consisting of sodium, lithium, potassium and yttrium and at least one other selected from the group consisting of lead, calcium, strontium, barium, cadmium and mercury;

B represents cations having ionic radii in the range of about 0.9 to about 1.6 A. some of which are trivalent molybdenum and tungsten, with the proviso that when A represents bismuth and lead, B can represent tungsten alone;

$\square$ represents a cation vacancy in the crystal structure; and z represents a positive number in the range of about 0.001 to about 0.075.

2. A catalyst according to claim 1 on a support.

3. A catalyst according to claim 1 in which z is about 0.005 to 0.05.

4. A catalyst according to claim 1 in which lead is present.

5. A catalyst according to claim 1 in which tungsten is present.

6. The catalyst according to claim 1 which is $$Pb_{.88}Bi_{.08}\square_{.04}MoO_4.$$

7. The catalyst according to claim 1 which is $$Pb_{.425}Na_{.19}Y_{.24}Bi_{.08}\square_{.065}MoO_4.$$

8. The catalyst according to claim 1 which is $$Pb_{.91}Bi_{.06}\square_{.03}WO_4.$$

9. The catalyst according to claim 1 which is $$Pb_{.88}Bi_{.08}\square_{.04}Mo_{.50}W_{.50}O_4.$$

10. The catalyst according to claim 1 which is $$Cd_{.487}Bi_{.087}\square_{.043}MoO_4.$$

11. The catalyst according to claim 1 which is $$Pb_{.985}Bi_{.01}\square_{.005}MoO_4.$$

12. A catalyst according to claim 1 having the formula $$A^{+2}_{1-3z} A^{+3}_{2z} \square_z B^{+6} O_4.$$

13. A catalyst according to claim 12 on a support.

14. A catalyst according to claim 12 in which $z$ is about 0.005 to 0.05.

References Cited

UNITED STATES PATENTS

| | | | |
|---|---|---|---|
| 3,161,670 | 12/1964 | Adams et al. | 260—604 R |
| 3,380,931 | 4/1968 | Ryland | 252—467 X |
| 3,232,978 | 2/1966 | Yasuhara et al. | 252—469 X |
| 3,362,998 | 1/1968 | Callahan et al. | 252—456 X |
| 3,492,248 | 1/1970 | Notari et al. | 252—467 |

FOREIGN PATENTS

| | | | |
|---|---|---|---|
| 247,304 | 6/1966 | Austria | 252—469 |

DANIEL E. WYMAN, Primary Examiner

W. J. SHINE, Assistant Examiner

U.S. Cl. X.R.

252—467, 468, 469; 260—465.3, 604 R

UNITED STATES PATENT OFFICE
CERTIFICATE OF CORRECTION

PATENT NO. : 3,843,553
DATED : October 22, 1974
INVENTOR(S) : Kamran Aykan, Donald B. Rogers and Arthur W. Sleight It is certified that error appears in the above-identified patent and that said Letters Patent are hereby corrected as shown below:

Column 3, line 37, "ocuur" should read --occur--.

Column 3, line 56, "the" should read --The--.

Column 6, line 6, "12.091" should read --12.109--.

Column 7, Table II, "(A-400 mesh)" should read --($\alpha$-400 mesh)--.

Column 7, line 40, "in" should read --in the--.

Column 8, line 64, "vraious" should read --various--.

Column 10, line 71, "$Cd_{.487}$" should read --$Cd_{.87}$--.

Column 10, line 42, "0.9 to about 1.6 A. some of which are trivalent" should be -- 0.3 to about 0.5 A. comprising molybdenum or --.

Signed and Sealed this

Ninth Day of November 1976

[SEAL]

Attest:

RUTH C. MASON
Attesting Officer

C. MARSHALL DANN
Commissioner of Patents and Trademarks